United States Patent
Ono et al.

(10) Patent No.: US 7,956,905 B2
(45) Date of Patent: Jun. 7, 2011

(54) TITLING APPARATUS, A TITLING METHOD, AND A MACHINE READABLE MEDIUM STORING THEREON A COMPUTER PROGRAM FOR TITLING

(75) Inventors: Shuji Ono, Kanagawa (JP); Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1366 days.

(21) Appl. No.: 11/356,219

(22) Filed: Feb. 17, 2006

(65) Prior Publication Data
US 2006/0192862 A1    Aug. 31, 2006

(30) Foreign Application Priority Data

Feb. 28, 2005 (JP) ................. 2005-053060
Feb. 28, 2005 (JP) ................. 2005-053721

(51) Int. Cl.
*H04N 5/76* (2006.01)
(52) U.S. Cl. ............ 348/231.5; 348/231.3; 348/231.2
(58) Field of Classification Search .......... 348/231.5, 348/231.2, 231.3, 231.4, 239, 222.1, 231.99–231.9; 707/1–10
See application file for complete search history.

(56) References Cited

U.S. PATENT DOCUMENTS

| | | | | |
|---|---|---|---|---|
| 5,506,644 A * | 4/1996 | Suzuki et al. | ........ | 396/319 |
| 6,590,608 B2 * | 7/2003 | Matsumoto et al. | ..... | 348/231.2 |
| 6,657,661 B1 * | 12/2003 | Cazier | ........ | 348/231.2 |
| 6,690,833 B1 * | 2/2004 | Chiang et al. | ........ | 382/236 |
| 6,690,883 B2 * | 2/2004 | Pelletier | ........ | 396/321 |
| 6,721,002 B1 * | 4/2004 | Dotsubo et al. | ........ | 348/239 |
| 6,741,864 B2 * | 5/2004 | Wilcock et al. | ........ | 455/456.1 |
| 6,816,836 B2 * | 11/2004 | Basu et al. | ........ | 704/270 |
| 2003/0103149 A1 * | 6/2003 | Kinjo et al. | ........ | 348/231.5 |
| 2003/0167153 A1 * | 9/2003 | Alexander | ........ | 702/189 |
| 2003/0231769 A1 * | 12/2003 | Bolle et al. | ........ | 380/210 |
| 2004/0201740 A1 * | 10/2004 | Nakamura et al. | ........ | 348/231.3 |
| 2004/0220807 A9 * | 11/2004 | Tamir et al. | ........ | 704/246 |
| 2004/0264810 A1 * | 12/2004 | Taugher et al. | ........ | 382/305 |
| 2005/0091596 A1 * | 4/2005 | Anthony et al. | ........ | 715/712 |

FOREIGN PATENT DOCUMENTS

JP           2002-10178 A     1/2002

* cited by examiner

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

An apparatus for giving a title to a captured image includes a unit for storing a captured image group including a plurality of captured images, a unit for storing an image capturing time when each of the stored images is captured, a unit for judging an image capturing period and an image capturing season including the stored image capturing time, a unit for storing terms respectively related to a plurality of periods with different time widths each of which includes a period and a season, the term corresponding to the period and the season, and a unit for giving a title to the stored captured image group by using a term related to a period of a wider time width out of the stored terms as a difference between the image capturing time and either the image capturing season or the acquired output time, whichever is longer.

15 Claims, 9 Drawing Sheets

270

| PERIOD | TERMINOLOGY | | | |
|---|---|---|---|---|
| OCTOBER 9, 2004 | ATHLETIC MEET | OCTOBER 9 | OCTOBER | FALL | 2004 |
| OCTOBER 10, 2004 | | OCTOBER 10 | | | |
| OCTOBER 11, 2004 | | OCTOBER 11 | | | |
| ... | ... | ... | ... | | |
| NOVEMBER 3, 2004 | CULTURAL FESTIVAL | NOVEMBER 3 | NOVEMBER | | |
| ... | ... | ... | ... | | |
| DECEMBER 1, 2004 | BIRTHDAY | DECEMBER 1 | DECEMBER | | |
| ... | ... | ... | ... | WINTER | |
| JANUARY 1, 2005 | FIRST MONTH OF THE YEAR | JANUARY 1 | JANUARY | | 2005 |
| ... | ... | ... | ... | ... | ... |

| LOCATION | | TERMINOLOGY | | | |
|---|---|---|---|---|---|
| LATITUDE | LONGITUDE | | | | |
| NORTH LATITUDE 34.58.55 | EAST LONGITUDE 135.45.40 | KYOTO STATION | | | |
| NORTH LATITUDE 34.59.30 | EAST LONGITUDE 135.47.15 | KIYOMIZUDERA | KYOTO CITY | KYOTO PREFECTURE | JAPAN |
| NORTH LATITUDE 35.02.10 | EAST LONGITUDE 135.43.55 | KINKAKUZI | | | |
| ... | ... | ... | ... | ... | |
| NORTH LATITUDE 35.39.20 | EAST LONGITUDE 139.44.55 | TOKYO TOWER | MINATOKU | TOKYO DISTRICT | |
| ... | ... | ... | ... | ... | ... |

212

| PERSON ID | FACE IMAGE |
|---|---|
| #601 | FACE IMAGE DATA 601 |
| #602 | FACE IMAGE DATA 602 |
| ⋮ | ⋮ |

| PERSON ID | VOICEPRINT |
|---|---|
| #701 | VOICEPRINT DATA 701 |
| #702 | VOICEPRINT DATA 702 |
| ⋮ | ⋮ |

| PERSON ID | PERSON ID | RELATIONSHIP |
|---|---|---|
| #601 | #602 | BROTHER |
| #601 | #701 | FATHER |
| #701 | #702 | FRIEND |
| ⋮ | ⋮ | ⋮ |

*FIG. 8*

TITLING APPARATUS, A TITLING METHOD, AND A MACHINE READABLE MEDIUM STORING THEREON A COMPUTER PROGRAM FOR TITLING

CROSS REFERENCE TO RELATED APPLICATION

The present application claims priority from Japanese Patent Applications Nos. JP 2005-053060 filed on Feb. 28, 2005 and JP 2005-053721 filed on Feb. 28, 2005, the contents of which are incorporated herein by reference.

BACKGROUND OF THE INVENTION

1. Field of the Invention

The present invention relates to a titling apparatus, a titling method, and a machine readable medium storing thereon a computer program for titling. More particularly, the present invention relates to a titling apparatus and a tilting method for giving a title to a captured image, and a machine readable medium storing thereon a computer program for the tilting apparatus.

2. Related Art

A technique for giving a title to an image data on the basis of a result of inferring a context of the image data from date and time, location information, or the like accompanied with the image data, and previously registered map information, knowledge of seasonal events, knowledge of a calendar, or the like, is known as shown in, for example, Japanese Patent Application Publication No. 2002-10178.

SUMMARY OF THE INVENTION

However, the above Japanese patent application does not disclose a technique for giving a title to a plurality of image data, which is proper for the image capturing time and a range of image capturing places of the plurality of image data, such an a case of giving a title to an album including a plurality of image data. Therefore, when a user intends to give a title to an album, the user has been required to conduct complicated works such as determining a title proper for a range of image capturing time, a range of image capturing places, and the like, of images included in the album and recording the title in the album.

Therefore, it is an object of the present invention to provide a titling apparatus, a titling method, and a machine readable medium storing thereon a computer program for titling, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a titling apparatus for giving a title to a captured image, includes: a captured image storing unit for storing a captured image group include a plurality of captured images; an image capturing time storing unit for storing image capturing time when each of the plurality of captured images stored by the captured image storing unit is captured; an image capturing period judging unit for judging an image capturing period and an image capturing season including the image capturing time stored by the image capturing time storing unit; a period terminology storing unit for storing terminology related to the period and the season, the terminology corresponding to the period and the season; and a titling unit for giving a title to the captured image group stored by the captured image storing unit by using the terminology stored by the period terminology storing unit to be corresponding to the period and the season including the image capturing period and the image capturing season judged by the image capturing period judging unit.

The titling apparatus may further include an output time acquiring unit for acquiring an output time when the plurality of captured images stored by the captured image storing unit are required to output, the period terminology storing unit may store a plurality of terms respectively related to a plurality of periods with different time widths each of which includes a period and a season, the term corresponding to the period and the season, and the titling unit may give a title by using a term related to a period of a wider time width out of the plurality of terms stored by the period terminology storing unit as a difference between the image capturing time included in the image capturing period and the image capturing season judged by the image capturing period judging unit and the output time acquired by the output time acquiring unit is longer.

The titling apparatus may further include an image capturing location storing unit for storing an image capturing location where each of the plurality of captured images stored by the captured image storing unit is captured, an image capturing region judging unit for judging an image capturing region including the image capturing location stored by the image capturing location storing unit; and a region terminology storing unit for storing terminology related to regions include the locations, the terminology corresponding to the regions, and the titling unit may give the title to the captured image group by further using the terminology corresponded to the location in the image capturing region judged by the image capturing region judging unit, the terminology being stored by the region terminology storing unit.

The titling apparatus may further include a reference location storing unit for storing a predetermined reference location, the region terminology storing unit may store a plurality of terms respectively related to a plurality of regions of different sizes include the locations, the terms corresponding to the locations, and the titling unit may give the title by using a term related to a region of a larger size out of the plurality of terms stored by the region terminology storing unit as a difference between the image capturing location, included in the image capturing region judged by the image capturing region judging unit, and the reference location stored by the reference location storing unit is farther.

The titling apparatus may further include an outputting unit for outputting a plurality of images comprised in the captured image group stored by the captured image storing unit and a title given by the titling unit at the same time. The titling apparatus may further include a person to be captured deciding unit for deciding a person to be captured of the captured image stored by the captured image storing unit, and a viewer deciding unit for deciding a viewer who views the captured image output by the outputting unit. The titling unit may give the title to the captured image group stored by the captured image storing unit based on a relationship between the person to be captured decided by the person to be capture deciding unit and the viewer decided by the viewer deciding unit, and the outputting unit may output the plurality of images comprised in the captured image group stored by the captured image storing unit and the title given by the titling unit at the same time.

the person to be captured deciding unit may decide each person to be captured of the plurality of captured images stored by the captured image storing unit, and the titling unit may give the title to the captured image group stored by the captured image storing unit based on a relationship between the person to be captured of the most captured images out of the plurality of persons decided by the person to be captured deciding unit and the viewer decided by the viewer deciding unit. The titling unit may further include a personal relationship storing unit for storing a mutual relationship among a plurality of persons, and the titling unit may decide the relationship between the person to be captured decided by the person to be captured deciding unit and the viewer decided by the viewer deciding unit based on the mutual relationship among the plurality of persons stored by the personal relationship storing unit.

The titling apparatus may further include a face image storing unit for storing a face image of a person corresponded to the person, and the person to be captured deciding unit may decide the person to be captured stored by the captured image storing unit by comparing captured image stored by the captured image storing unit with the face image stored by the face image storing unit. The titling apparatus may further include an image capturing unit for capturing the viewer who views the captured image output by the outputting unit and a face image storing unit for storing the face image of the person corresponded to the person, and the viewer deciding unit may decide the viewer who views the captured image output by the outputting unit by comparing the viewer image captured by the image capturing unit with the face image stored by the face image storing unit.

The titling apparatus may further include a recording unit for recording a voice of the viewer who views the captured image output by the outputting unit and a voice storing unit for storing the voice of a person corresponded to the person, and the viewer deciding unit may decide the viewer who views the captured image output by the outputting unit by comparing the voice recorded by the recording unit with the voice stored by the voice storing unit.

According to the second aspect of the present invention, a titling method for giving a title on a captured image, includes: a captured image storing step of storing a captured image group include a plurality of captured images; an image capturing time storing step of storing an image capturing time when each of the plurality of the captured images stored in the captured image storing step is captured; an image capturing period judging step of judging an image capturing period and an image capturing season including the image capturing time stored in the image capturing time storing step; a period terminology storing step of storing terminology related to the period and the season, the terminology corresponding to the period and the season; and a titling step of giving a title to the captured image group stored in the captured image storing step by using the terminology stored in the period terminology storing step to be corresponding to the period and the season including the image capturing period and the image capturing season judged in the image capturing period judging step.

According to the third aspect of the present invention, a machine readable medium storing thereon a computer program for a titling apparatus for giving a title to a captured image is provided, wherein the program makes the tiling apparatus functions as: a captured image storing unit for storing captured image group include a plurality of captured images; an image capturing time storing unit for storing an image capturing time when each of the plurality of captured images stored by the captured image storing unit is captured; an image capturing period judging unit for judging an image capturing period and an image capturing season including the image capturing time stored by the image capturing time storing unit; a period terminology storing unit for storing terminology related to the period and the season, the terminology corresponding to the period and the season; and a titling unit for giving a title to the captured image group stored by the captured image storing unit by using the terminology stored by the period terminology storing unit, to be corresponding to the period and the season including the image capturing period and the image capturing season judged by the image capturing period judging unit.

According to the fourth aspect of the present invention, a titling apparatus for giving a title to a captured image, includes: a captured image storing unit for storing captured image group include a plurality of captured images; an image capturing location storing unit for storing an image capturing location where each of the plurality of captured images stored by the captured image storing unit is captured; an image capturing region judging unit for judging an image capturing region including the image capturing location stored by the image capturing location storing unit; a region terminology storing unit for storing terminology related to regions including the locations, the terminology corresponding to the regions; and a titling unit for giving a title to the captured image group stored by the captured image storing unit by using the terminology corresponded to the location in the image capturing region judged by the image capturing region judging unit, the terminology being stored by the region terminology storing unit.

According to the fifth aspect of the present invention, titling method for giving a title to a captured image, includes: a captured image storing step of storing captured image group include a plurality of captured images; an image capturing location storing step of storing an image capturing location where each of the plurality of captured images stored in the captured image storing step is captured; an image capturing region judging step of judging an image capturing region including the image capturing location stored in the image capturing location storing step; a region terminology storing step of storing terminology related to regions including the locations, the terminology corresponding to the regions; and a titling step of giving a title to the captured image group stored in the captured image storing step by using the terminology corresponded to the location in the image capturing region judged in the image capturing region judging step, the terminology being stored in the region terminology storing step.

According to the sixth aspect of the present invention, a machine readable medium storing thereon a computer program for a titling apparatus for giving a title to a captured image is provided, wherein the program makes the tiling apparatus functions as: a captured image storing unit for storing captured image group include a plurality of captured images; an image capturing location storing unit for storing an image capturing location where each of the plurality of captured images stored by the captured image storing unit is captured; an image capturing region judging unit for judging an image capturing region including the image capturing location stored by the image capturing location storing unit; a region terminology storing unit for storing terminology related to regions including the locations, the terminology corresponding to the regions; and a titling unit for giving a title to the captured image group stored by the captured image storing unit by using the terminology corresponded to the location in the image capturing region judged by the image capturing region judging unit, the terminology being stored by the region terminology storing unit.

According to the seventh aspect of the present invention, a titling apparatus for giving a title to a captured image, includes: a captured image storing unit for storing a captured image; a person to be captured deciding unit for deciding a person to be captured of the captured image stored by the captured image storing unit; an outputting unit for outputting the captured image stored by the captured image storing unit; a viewer deciding unit for deciding a viewer who views the captured image output by the outputting unit; a titling unit for giving a title to the captured image stored by the captured image storing unit based on a relationship between the person to be captured decided by the person to be capture deciding unit and the viewer decided by the viewer deciding unit; and an output controlling unit for making the outputting unit output the title given to the captured image by the titling unit as well as the captured image stored by the captured image storing unit.

According to the eighth aspect of the present invention, a titling method for giving a title to a captured image, includes: a captured image storing step of storing a captured image; a person to be captured deciding step of deciding a person to be captured of the captured image stored in the captured image storing step; an outputting step of outputting the captured image stored in the captured image storing step; a viewer deciding step of deciding a viewer who views the captured image output in the outputting step; a titling step of giving a title to the captured image stored in the captured image storing step based on a relationship between the person to be captured decided in the person to be capture deciding step and the viewer decided in the viewer deciding step; and an output controlling step of making the title given to the captured image in the titling step as well as the captured image stored in the captured image storing step output in the outputting step.

According to the ninth aspect of the present invention, a machine readable medium storing thereon a computer program for a titling apparatus for giving a title to a captured image is provided, wherein the program makes the tiling apparatus functions as: a captured image storing unit for storing a captured image; a person to be captured deciding unit for deciding a person to be captured of the captured image stored by the captured image storing unit; an outputting unit for outputting the captured image stored by the captured image storing unit; a viewer deciding unit for deciding a viewer who views the captured image output by the outputting unit; a titling unit for giving a title to the captured image stored by the captured image storing unit based on a relationship between the person to be captured decided by the person to be capture deciding unit and the viewer decided by the viewer deciding unit; and an output controlling unit for making the outputting unit output the title given to the captured image by the titling unit as well as the captured image stored by the captured image storing unit.

The summary of the invention does not necessarily describe all necessary features of the present invention. The present invention may also be a sub-combination of the features described above.

According to the present invention, it is possible to provide a titling apparatus for enabling to give a title which is proper for a user to an image.

BRIEF DESCRIPTION OF THE DRAWINGS

FIG. 3 shows an example of data stored by a period terminology storing unit 270 in a format of table.

FIG. 4 shows an example of data stored by a region terminology storing unit 290 in a format of table.

FIG. 6 shows an example of data stored by a face image storing unit 212 in a format of table.

FIG. 7 shows an example of data stored by a voice storing unit 218 in a format of table.

FIG. 8 shows an example of data stored by a personal relationship storing unit 284 in a format of table.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
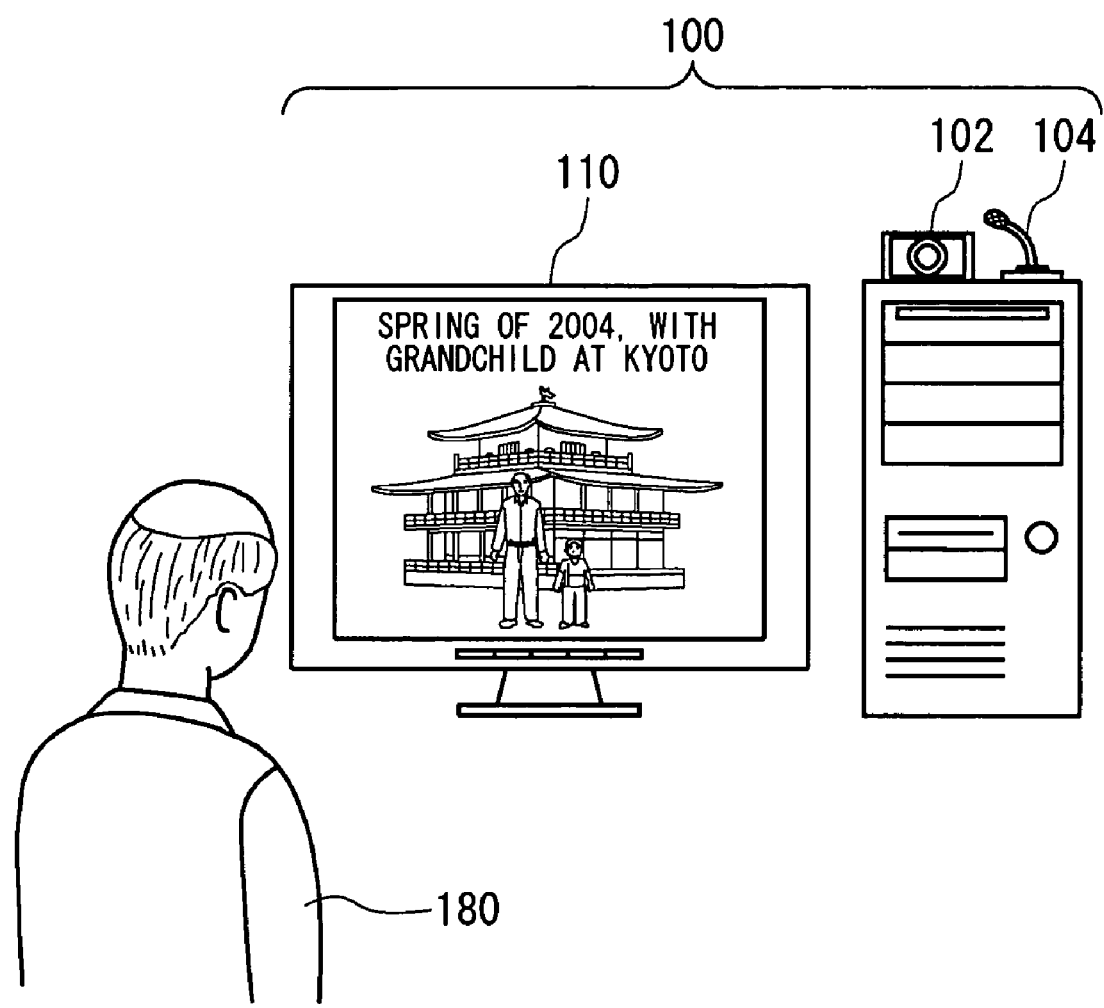
FIG. 1 shows an example of conditions for using a titling apparatus 100.

FIG. 1 shows an example of conditions for using a titling apparatus 100 according to an embodiment of the present invention. FIG. 1 shows a personal computer for giving a title to a captured image and displaying the captured image on an outputting unit 110 such as a liquid crystal display, as an example of the titling apparatus 100. The titling apparatus 100 stores a plurality of images captured by using a digital still camera or the like, together with the image capturing place and the image capturing time of every images. Further, when displaying an image selected by a user 180, the titling apparatus 100 records the image together with a title related with the image capturing time and place of the image. Then, the titling apparatus 100 displays the comlocation of the image and the title on the outputting unit 110. For example, when displaying an image captured at Kinkakuzi in the spring of 2004, the titling apparatus 100 displays the image together with a title such as "Spring of 2004, at Tokyo." Further, the titling apparatus 100 may give a title to each of a plurality of images or a title to a plurality of images such as an album including the plurality of images.

Further, the titling apparatus 100 gives different titles according a plurality of images displayed at one time on the screen of the outputting unit 110. For example, the titling apparatus 100 may give titles of, for example, "May 2004, at Kinkakuzi" and "May 2004, at the Kyoto station" to two images captured at Kinkakuzi and the Kyoto station, respectively, each of which defines the image capturing time and the image capturing place of each image, instead of giving the same title of "Spring of 2004, at Kyoto" to the images. Further, in case the same titles are given to a plurality of albums, the titling apparatus 100 gives a new title to each of the plurality albums, the new title using terminology defining a range of image capturing time and a range of image capturing places of images included in the album, in order to give different titles to the plurality albums.

Further, the titling apparatus 100 identifies a person to be captured of an image by the person's face shown in the image. Further, the titling apparatus 100 identifies a user 180 who is viewing the image by a face of the user 180 captured by an image capturing unit 102 provided in the titling apparatus 100 and/or a voice of the user 180 recorded by a recording unit 104 provided in the titling apparatus 100. Then, the titling apparatus 100 gives a title to the image corresponding to a personal relationship between the user 180 and the person to be captured. For example, when the titling apparatus 100 judges that the person to be captured is a grandchild of the user 180, it gives a title of "Spring of 2004, with the grandchild at Kyoto" to the image.

Further, the titling apparatus 100 may be a device for displaying images such as an electronic photo-stand, an HD TV, as well as a personal computer. Furthermore, the titling apparatus 100 may be a digital still camera, a cellular phone with a camera, a PDA, or the like, and it may capture an image, give a title to the image, and display the image with the title on its screen. Further, the titling apparatus 100 may be an apparatus for printing an image such as a printer and printout the image with a title. In addition, the titling apparatus 100 may manage a plurality of images on the basis of a title given to the images. For example, the titling apparatus 100 may manage a plurality of images by storing the images in a directory of which name is a title given to the images.

According to the titling apparatus 100 described above, it is possible to give a proper title to an image automatically and provide the image with the title to the user 180. By this, the user 180 can enjoy images without trouble in determining titles proper for contexts of a large number of images and recording the titles.

Figure 2:
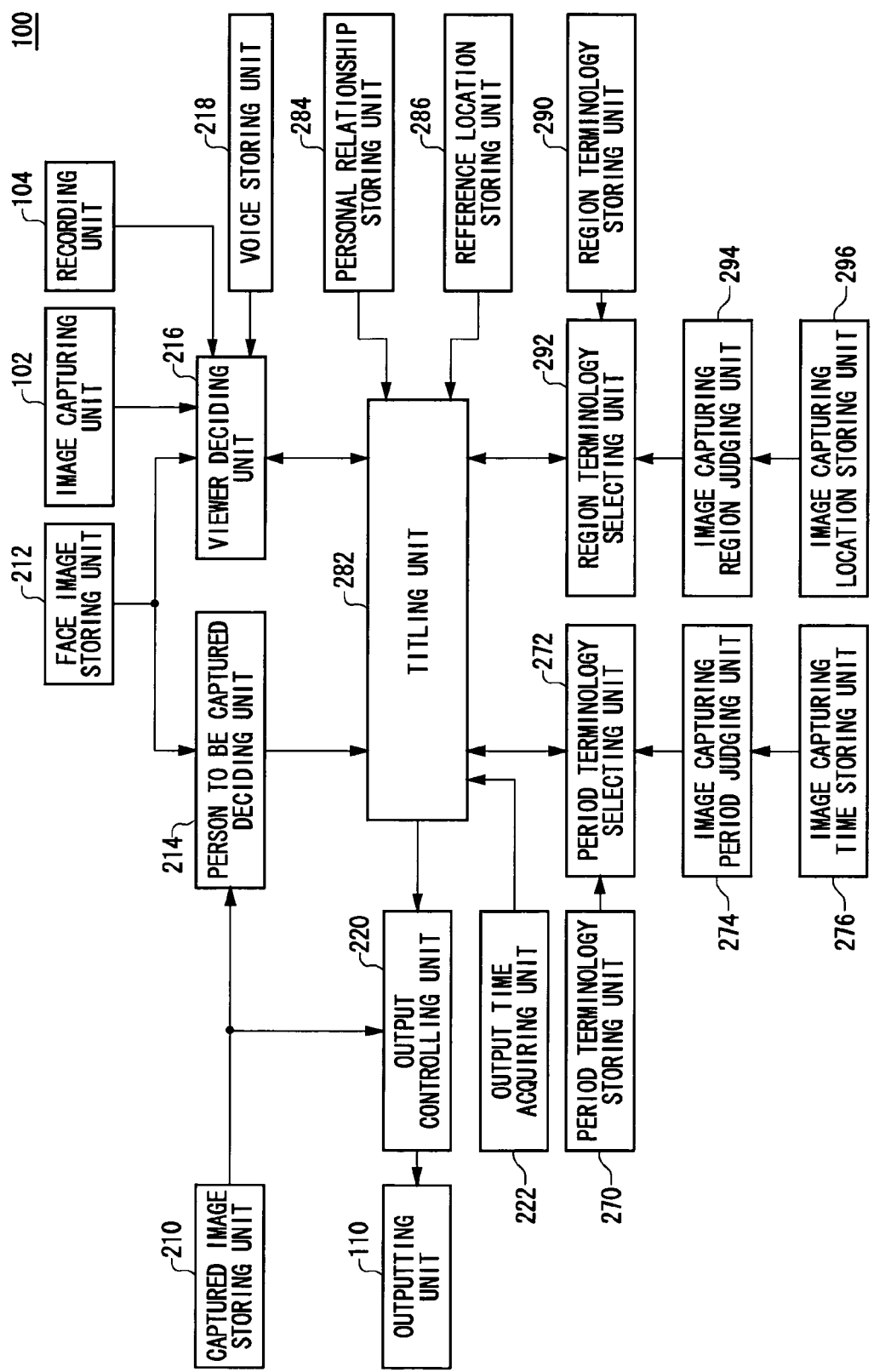
FIG. 2 shows a block configuration of the titling apparatus 100.

FIG. 2 shows an example of a block configuration of the titling apparatus 100. The titling apparatus 100 includes an image capturing unit 102, a recording unit 104, an outputting unit 110, a captured image storing unit 210, a face image storing unit 212, a person to be captured deciding unit 214, a viewer deciding unit 216, a voice storing unit 218, an output controlling unit 220, an output time acquiring unit 222, a period terminology storing unit 270, a period terminology selecting unit 272, an image capturing period judging unit 274, an image capturing time storing unit 276, a titling unit 282, a personal relationship storing unit 284, a reference location storing unit 286, a region terminology storing unit 290, a region terminology selecting unit 292, an image capturing region judging unit 294, and an image capturing location storing unit 296.

The captured image storing unit 210 stores a captured image group including a plurality of captured images. The image capturing location storing unit 296 stores an image capturing location where each of the plurality of captured images stored by the captured image storing unit 210. Further, the image capturing time storing unit 276 stores image capturing time when each of the plurality of captured images stored by the captured image storing unit 210. For example, the captured image storing unit 210 stores each of the plurality of captured images with an image ID corresponding to and identifying the captured images. Further, the image capturing location storing unit 296 stores the latitude and the longitude received from a GPS satellite at the time when the captured image has been captured, to be corresponding to the image ID of the captured image. Further, the image capturing time storing unit 276 stores the image capturing time when the captured image has been captured, to be corresponding to the image ID of the captured image.

The image capturing period judging unit 274 judges an image capturing period and an image capturing season including the image capturing time stored by the image capturing time storing unit 276. The image capturing period judging unit 274 judges a period of time between the oldest image capturing time and the most recent image capturing time out of the image capturing time when the plurality of captured images included in the captured image group have been captured stored by the image capturing time storing unit 276.

The period terminology storing unit 270 stores terminology related to a period and a season to be corresponding to the period and the season. Further, the period terminology storing unit 270 stores a plurality of terms each of which is related to each of a plurality of periods with different time widths including a period and a season, to be corresponding to the period and the season. For example, as terminology related to October, 2004, the period terminology storing unit 270 stores terms, such as "October," "fall," and "2004," corresponding to a plurality of periods with different time widths.

The period terminology selecting unit 272 selects a term stored in the period terminology storing unit 270 to correspond to a time within an image capturing period including image capturing time of a plurality of captured images included in the captured image group stored by the captured image storing unit 210. Specifically, the period terminology selecting unit 272 selects a term stored by the period terminology storing unit 270 to correspond to a period including image capturing time stored by the image capturing time storing unit 276. More specifically, the period terminology selecting unit 272 selects a term stored in the period terminology storing unit 270 to correspond to the image capturing period and the image capturing season judged by the image capturing period judging unit 274. For example, in case the image capturing period judging unit 274 judges that an image captured in October is stored in the captured image storing unit 210, the period terminology selecting unit 272 selects "October" out of the terms stored by the period terminology storing unit 270.

The titling unit 282 gives a title to the captured image group stored by the captured image storing unit 210, using the term stored in the period terminology storing unit 270 to correspond to a period and a season including the image capturing period and the image capturing season judged by the image capturing period judging unit 274. Specifically, the titling unit 282 gives a title to the captured image stored by the captured image storing unit 210 using the term selected by the period terminology selecting unit 272.

The outputting unit 110 outputs a plurality of images included in the captured image group stored by the captured image storing unit 210 and the title given by the titling unit 282 at the same time. Specifically, the output control unit 220 makes the outputting unit 110 output the captured image stored in the captured image storing unit 210 and the title given by the titling unit 282. Further, the outputting unit 110 may be a display device for displaying an image such as a liquid crystal display or a print device for printing and outputting an image. Further, the outputting unit 110 may output the title on a device different from the device displaying the image.

The output time acquiring unit 222 acquires output time when output of a plurality of captured images stored by the captured image storing unit 210 has been required. Then, as a difference between the image capturing time included in the image capturing period and the image capturing season judged by the image capturing period judging unit 274 and the output time acquired by the output time acquiring unit 222 is longer, the titling unit 282 gives a title using a term related to a period with a broader time width out of a plurality of terms stored by the period terminology storing unit 270.

For example, in case the captured image is required to be output in winter of 2004, the period terminology selecting unit 272 selects "Fall" stored by the period terminology storing unit 270, and, in case the captured image is required to be output five years later, it selects "2004" related to a period with a broader time width. Thus, the period terminology selecting unit 272 can provide the titling unit 282 with a term which can be easily understood by the user 180.

The capturing region judging unit 294 judges an image capturing region including the image capturing location stored by the image capturing location storing unit 296. For example, capturing region judging unit 294 judges a region including a plurality of image capturing locations stored by the image capturing location storing unit 296 as an image capturing location of the captured image group including the plurality of captured images.

The region terminology storing unit 290 stores terminology related to a region including a location to be corresponding to the location. Further, the region terminology storing unit 290 stores a plurality of terms related to regions of different sizes including a location, respectively, to be corresponding to the location. For example, the region terminology storing unit 290 stores terms related to a plurality of regions of different sizes such as "Kinkakuzi," "Kyoto City," "Kyoto Prefecture," "Japan," and the like, to be corresponding to the latitude and the longitude of the location of Kinkakuzi.

The region terminology selecting unit 292 selects a term stored by the region terminology storing unit 290 to correspond to a location within an image capturing region including image capturing locations of a plurality of captured image included in the captured image group stored by the captured image storing unit 210. Specifically, the region terminology selecting unit 292 selects a term stored by the region terminology storing unit 290 to correspond to the image capturing location stored by the image capturing location storing unit 296. More specifically, the region terminology selecting unit 292 selects a term stored by the region terminology storing unit 290 to correspond to the image capturing region judged by the image capturing region judging unit 294.

The titling unit 282 gives a title to the captured image group stored by the captured image storing unit 210, by using further the term stored by the 290 to correspond to a location within the image capturing region judged by the image capturing region judging unit 294. Specifically, the titling unit 282 gives a title to the captured image group stored by the captured image storing unit 210 by using the term selected by the region terminology selecting unit 292.

The reference location storing unit 286 stores a predetermined reference location. Then, as a difference between the image capturing location included in the image capturing region judged by the image capturing region judging unit 294 and the reference location stored by the reference location storing unit 286 is farther, the titling unit 282 gives a title using a term related to a larger region out of a plurality of terms stored by the region terminology storing unit 290. For example, the reference location storing unit 286 stores a location, which is a base of life of the user 180, such as the location of the house of the user 180 having the titling apparatus 100. Then, the region terminology selecting unit 292 selects a term related to a larger region as the image capturing location becomes more distant from the location of the house of the user 180, for example, in the order of "Kyoto City," "Kyoto Prefecture," and "Japan." For example, in case a user 180 who lives in a country other than Japan views an image captured at Kinkakuzi, the titling unit 282 titles gives a title of "Memory of Japan" to the image. Then, for example, in case a user 180 who lives in Kyoto views the same image, the titling unit 282 gives to the image a title of not "Memory of Japan" which makes the user 180 feels a sense of incongruity but "Memory of Kinkakuzi" which is natural for the user 180.

The face image storing unit 212 stores face images of persons in a corresponding manner. The person to be captured deciding unit 214 decides a person to be captured of the captured image stored by the captured image storing unit 210. Specifically, the person to be captured deciding unit 214 decides a person to be captured of the captured image stored by the captured image storing unit 210 by comparing the captured image stored by the captured image storing unit 210 and the face image stored by the face image storing unit 212.

The image capturing unit 102 captures an image of a viewer who views a captured image output by the outputting unit 110. The viewer deciding unit 216 decides a viewer who views a captured image output by the outputting unit 110. Specifically, the viewer deciding unit 216 decides a viewer who views a captured image output by the outputting unit 110 by comparing the image of the viewer captured by the image capturing unit 102 and the face image stored by the face image storing unit 212.

The voice storing unit 218 stores voices of persons in a corresponding manner. The recording unit 104 records a voice of the viewer who views the captured image output by the outputting unit 110. Then, the viewer deciding unit 216 decides the viewer who views the captured image output by the outputting unit 110 by comparing the voice recorded by the recording unit 104 and the voice stored by the voice storing unit 218. For example, the voice storing unit 218 stores voiceprint data of persons in a corresponding manner. Then, the viewer deciding unit 216 decide the viewer by combining a voiceprint of the voice recorded by the recording unit 104 and a voiceprint stored by the voice storing unit 218.

The personal relationship storing unit 284 stores personal relationships among a plurality of persons. On the basis of a personal relationship between the person to be captured decided by the person to be captured deciding unit 214 and the viewer decided by the viewer deciding unit 216, the titling unit 282 gives a title to the captured image group stored by the captured image storing unit 210. Specifically, the titling unit 282 decides a relationship between the person to be captured decided by the person to be captured deciding unit 214 and the viewer decided by the viewer deciding unit 216 on the basis of the relationships among the plurality of persons. For example, the personal relationship storing unit 284 stores personal relationships such as "Father" and "Brother." Then, the titling unit 282 gives a title including a personal relationship stored in the personal relationship storing unit 284 to the image.

Further, the person to be captured deciding unit 214 decides a person to be captured of each of the plurality of captured images stored by the captured image storing unit 210. Then, the titling unit 282 gives a title to the captured image group stored by the captured image storing unit 210 on the basis of a relationship between the person of the most captured images and the viewer decided by the viewer deciding unit 216. By this, even if a visitor who has nothing to do with the user 180 is shown in an image captured at a tourist spot, the person to be captured deciding unit 214 can properly decide a person to be captured who the user 180 wants to find.

Further, in case the titling unit 282 gives the same titles to a first and a second captured images, the period terminology selecting unit 272 selects a first term related to a period with a time width shorter than that of the term previously given to the first captured image out of the terms stored by the period terminology storing unit 270 to correspond to the image capturing time of the first captured image. Then, the terminology selecting unit 272 further selects a second term related to a period with a time width shorter than that of the term previously given to the second captured image out of the terms stored by the period terminology storing unit 270 to correspond to the image capturing time of the second captured image. Then, the titling unit 282 gives a new title using the first term selected by terminology selecting unit 272 to the first captured image. Further, the titling unit 282 gives a new title using the second term selected by the terminology selecting unit 272 to the second captured image.

Further, in case a title given to a second captured image group, such as an album previously made by the user 180 and a title given to a first captured image group, such as an album newly made by the user 180, are the same, the period terminology selecting unit 272 newly selects a term related to a period with a time width shorter than that of the term given to the first captured image group. Then, the titling unit 282 gives a new title using the term newly selected by the period terminology selecting unit 272 to the first captured image group. Further, the period terminology selecting unit 272 selects a term which is related to a period with a time width shorter than that of the term given to the second captured image group and which is different from the term used when the new title is given to the first captured image group. Then, the titling unit 282 gives a new title using the term selected by the period terminology selecting unit 272 to the second captured image group.

Further, in case the titling unit 282 gives the same titles to a first and a second captured images, the region terminology selecting unit 292 selects a first term related to a region of a size smaller than that of the term previously given to the first captured image out of the terms stored by the region terminology storing unit 290 to correspond to the image capturing location of the first captured image. Then, the region terminology selecting unit 292 further selects a second term related to a region of a size smaller than that of the term previously given to the second captured image out of the terms stored by the region terminology storing unit 290 to correspond to the image capturing location of the second captured image. Then, the titling unit 282 gives a new title using the term newly selected by the region terminology selecting unit 292 to the first captured image. Then, the titling unit 282 gives a new title using the term selected by the region terminology selecting unit 292 to the second captured image group.

Further, in case a title given to a second captured image group, such as an album previously made by the user 180 and a title given to a first captured image group, such as an album newly made by the user 180, are the same, the region terminology selecting unit 292 newly selects a term related to a region of a size smaller than that of the term given to the first captured image group. Then, the titling unit 282 gives a new title using the term newly selected by the region terminology selecting unit 292 to the first captured image group. Further, the region terminology selecting unit 292 selects a term which is related to a region of a size smaller than that of the term given to the second captured image group and which is different from the term used when the new title is given to the first captured image group. Then, the titling unit 282 gives a new title using the term selected by the region terminology selecting unit 292 to the second captured image group. By this, the titling apparatus does not give to a newly made album a title which is the same as that given to an existing album. Therefore, the user 180 can easily distinguish each of albums from the others.

According to the titling apparatus 100 described above, it is possible to provide an image to which a proper title corresponding to the place where the image has been captured, the time when the image has been captured, and the person to be captured and/or the viewer of the image, is given. Further, the user 180 can enjoy conveniently an image to which a proper title is given without conducting complicated works such as entering a title to the image with his or her hands. Further, since the titling unit 282 gives a different title for each of a plurality of albums and/or a plurality of images, the user 180 can easily distinguish the plurality of albums and/or the plurality of images from each other.

FIG. 3 shows an example of data stored by the period terminology storing unit 270 in a format of table. The period terminology storing unit 270 stores a term related each of a plurality of periods with different seasons and time widths. Further, the period terminology storing unit 270 stores the terms. For example, the period terminology storing unit 270 stores terms of "Athletic Meet," "October 9," "October" "Fall" and "2004" as terms related to Oct. 9, 2004. For example, the period terminology selecting unit 272 can select the term of "October 9" as a title to give to an image captured on October 9 and further select the term of "Athletic Meet." Further, for example, the period terminology selecting unit 272 can select a term of "Athletic Meet on October 9." Further, for example, the period terminology selecting unit 272 can select a term of "Athletic Meet in October" as an image captured on October 9 and 10. Therefore, the period terminology storing unit 270 can provide a proper term corresponding to a time range during which a plurality of images are captured to the titling unit 282.

Further, the period terminology storing unit 270 mat store a term showing a season and a period matching to the present time. For example, the period terminology storing unit 270 stores a term of "This Year" for a point of time in the year of 2004 as a term of a time range showing the year of 2004. Then, the period terminology storing unit 270 may change a term stored therein as time goes by. For example, the period terminology storing unit 270 changes the term a time range showing the year of 2004 to "Last Year" when it turns 2005. By this, the period terminology storing unit 270 can provide a proper term matching with the sense of time of a human being to the titling unit 282.

Further, the period terminology storing unit 270 may be embodied by terminology data stored by a software for making the titling apparatus 100 function or in a recording medium. Further, the period terminology storing unit 270 may receive a term input by the user 180 and store the term. By this, the period terminology storing unit 270 can provide a term corresponding to each user 180 such as "Birthday" to the titling unit 282.

FIG. 4 shows an example of data stored by the region terminology storing unit 290 in a format of table. The region terminology storing unit 290 stores a term related to each of a plurality of regions of different sizes, to be corresponding to information on the latitude and the longitude. For example, the region terminology storing unit 290 stores "Kyoto Station," "Kyoto City," "Kyoto Prefecture," and "Japan," to be corresponding to information on the latitude and the longitude of Tokyo station. At this time, the region terminology selecting unit 292 may select "Kyoto Station" for an image captured at Kyoto station, for example. Further, for example, the region terminology selecting unit 292 can give a title of "Kyoto City" to images captured at "Kinkakuzi" and "Kyoto Station." As a result, the region terminology storing unit 290 can provide a proper term including a plurality of regions where a plurality of images are captured to the titling unit 282.

Further, the reference location storing unit 286 stores a predetermined reference location, for example, the latitude and the longitude of the location of the house of the user 180. At this time, for example, when the house of the user 180 is in a country other than Japan, the region terminology storing unit 290 can provide the term of "Japan" to the titling unit 282 as a term for a title to be given to an image captured at Kinkakuzi. Further, when a user 180 whose house is in Kyoto prefecture views the same image, the region terminology storing unit 290 can provide the term of "Kinkakuzi" to the titling unit 282. As a result, for example, when a user 180 whose house is in a country other than Japan views an image captured at Kinkakuzi, a title of "Memory of Japan in 2004" is given to the image by the titling unit 282. Then, when a user 180 whose house is in Kyoto prefecture views the same image, the titling unit 282 gives to the image a title of not "Memory of Japan in 2004" which makes the user 180 feels a sense of incongruity but "Memory of Kinkakuzi in 2004" which is natural for the user 180.

Figure 5:
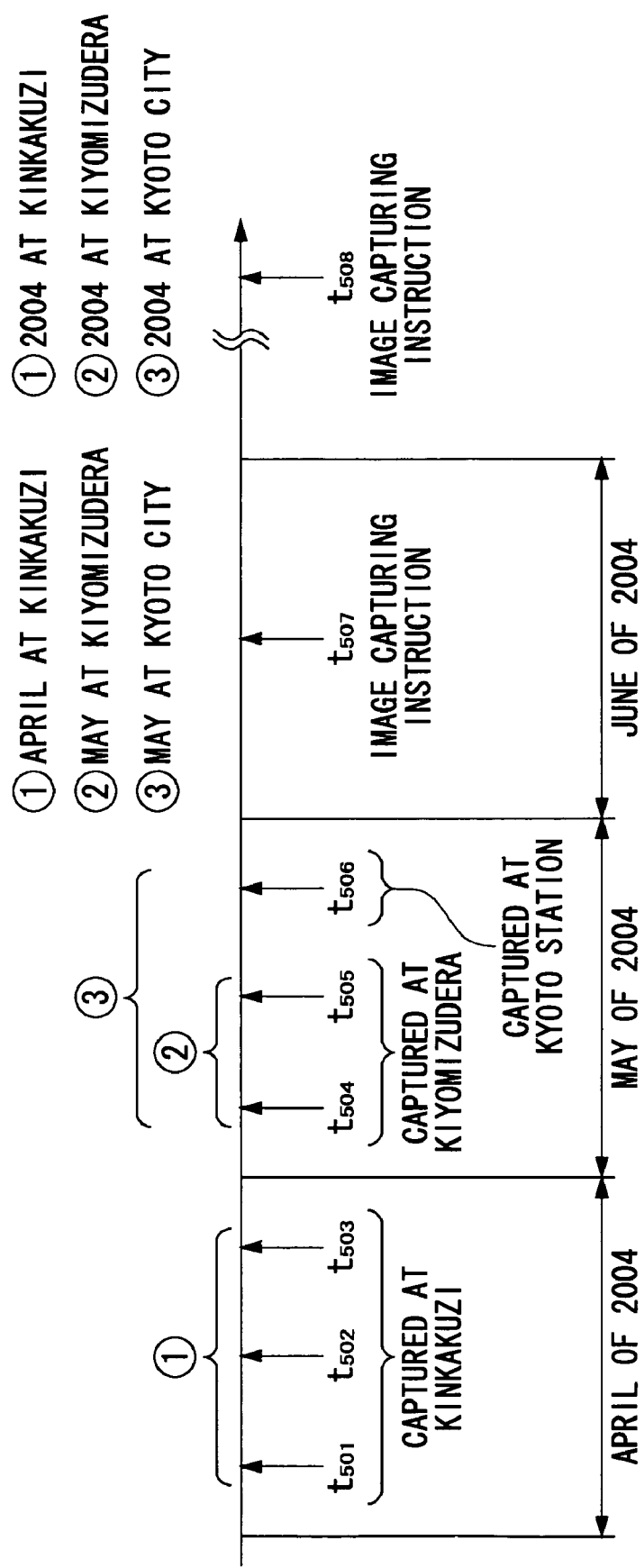
FIG. 5 shows an example of a captured image and a title given to the captured image.

FIG. 5 shows an example of a title given to a captured image. According to this example, the captured image storing unit 210 stores images captured at the time of t501~503 of April of 2004 and the time of t504~t506 of May of 2004. Further, the image capturing location storing unit 296 stores the latitude and the longitude of the image capturing locations of the images captured at the time of t501~503 at Kinkakuzi, the images captured at the time of t504 and t505 at Kiyomizudera, and the image captured at the time of t506 at Kyoto station.

In case the titling apparatus 100 is required to output the images captured at the time of t501-503 at the time of t507 which is June of 2004, the titling unit 282 gives a title of "in April at Kinkakuzi" to the images. Further, in case the titling apparatus 100 is required to output the images captured at the time of t504 and t505 at the time of t507, a title of "in May at Kiyomizudera" is given to the images. Further, in case the titling apparatus 100 is required to output the images captured at the time of t504~t506 at the time of t507, a term showing a region including the image capturing location, for example, "Kyoto City" is selected from the region terminology storing unit 290 and a title "in May at Kyoto City" is given to the images.

Further, in case the titling apparatus 100 is required to output the images captured at the time of t501~503 at the time of t508 in 2005, the titling apparatus 100 selects a term related to a time range with a time width broader than that of "May," for example, "2004" from the period terminology storing unit 270 and a title of "in 2004 at Kinkakuzi" is given to the images. Similarly, at the time of t508, the titling unit 282 gives the titles of "in 2004 at Kiyomizudera" and "in 2004 at Kyoto City" to the images captured at the time of t504~505 and the images captured at the time of t504~t506, respectively. Further, in case the user 180 sets the reference location in the reference location storing unit 286 to a country other than Japan, the titling apparatus 100 gives a title of "in 2004 in Japan" to the images captured at the time of t504~t506 and output the images. As described above, the titling apparatus 100 can give to an image a title which makes the user 180 easily understand the image capturing place and the image capturing time of the image.

FIG. 6 shows an example of data stored by the face image storing unit 212 in a format of table. The face image storing unit 212 stores a face image which is generated by capturing an image of the face of a person to be corresponding to a person ID for identifying the person. Further, the face image storing unit 212 may store a face image captured and recorded by the image capturing unit 102. In addition, the face image storing unit 212 may extract a face image of a person from a region of the image stored by the captured image storing unit 210 which is selected by the user 180 and store it. Further, the face image storing unit 212 may store a feature amount extracted from a face image instead of the face image itself. For example, the face image storing unit 212 may store a contour shape of a face, the shape of distinguished parts of the face such as eyes, a nose, and a mouth, a location of each of the distinguished parts, or a positional relationship between the distinguished parts.

Further, the viewer deciding unit 216 extracts a feature amount of the face of the viewer from the image captured by the image capturing unit 102, compares the feature amount with the feature amount of the face image stored by the face image storing unit 212, and decides an person ID of the viewer. Similarly, the person to be captured deciding unit 214 may extract a feature amount of a face image of an object shown in the captured image stored by the captured image storing unit 210 and decide a person ID of the person to be captured by comparing the feature amount with the feature amount stored by the face image storing unit 212. Further, the viewer deciding unit 216 and the person to be captured deciding unit 214 may decide a region including the face of a person by extracting a region of a color nearly a skin color and extract a feature amount of the face on the basis of the contour of the object by using an edge extraction for the region.

Further, the person to be captured deciding unit 214 may decide a person ID of a person to be captured by comparing an image of a predetermined range including the center of the captured image with the face image. Further, the person to be captured deciding unit 214 may extract a face image of the person to be captured from an object of a region of which frequency is larger than that of the predetermined region for the captured image. Further, the person to be captured deciding unit 214 may determine person IDs of a plurality of persons to be captured shown in the capture image.

FIG. 7 shows an example of data stored by the voice storing unit 218 in a format of table. The voice storing unit 218 stores a voiceprint data acquired from a voice of a person to be corresponding to a person ID of the person. Further, it is desirable that the voice storing unit 218 stores voiceprint data extracted from the person's voice recorded by the recording unit 104. Then, the viewer deciding unit 216 decides a person's ID of the viewer by extracting voiceprint data from the voice recorded by the recording unit 104 and comparing the voiceprint data with the voiceprint data stored by the voice storing unit 218.

FIG. 8 shows an example of data stored by the personal relationship storing unit 284 in a format of table. The personal relationship storing unit 284 stores a person ID for identifying a person, a person ID for identifying a person different from the person, and a relationship of the persons. According to the example of FIG. 8, the personal relationship storing unit 284 stores "Brother" as a personal relationship of a person ID #602 to a person of a person ID #601. Further, the personal relationship storing unit 284 stores "Father" as a personal relationship of a person ID #701 to the person of the person ID #601. Further, the personal relationship storing unit 284 stores "Friend" as a personal relationship of a person ID #702 to the person of the person ID #701.

Then, the titling unit 282 decides a relationship between a viewer and a person to be captured on the basis of the person IDs of the viewer and the person decided by the person to be captured deciding unit 214 and the viewer deciding unit 216, respectively, and the relationship stored by the personal relationship storing unit 284. Then, on the basis of the relationship, the titling unit 282 gives a title including a term showing the relationship to the image. For example, in case the viewer is the person identified by #601 and the person to be captured is the person identified by #602, the tiling unit 282 gives a title including "Brother" to the image. Further, for example, in case the viewer is the person identified by #601 and the person to be captured is the person identified by #702, the tiling unit 282 gives a title including "Friend of Father" to the image. Further, in case the viewer decided by the viewer deciding unit 216 is the same person as the person to be captured decided by the person to be captured deciding unit 214, a title including "I," for example, to the image. Further, in case the viewer deciding unit 216 decides that a plurality of persons to be captured including the viewer are shown in the image, the titling unit 282 may give a title indicating that the viewer is included in the image as a person to be captured, such as, "with Brother," for example.

Further, the titling unit 282 may include a title template for generating a title. For example, the titling unit 282 may include a title template for determining a title to which the period terminology selected by the period terminology selecting unit 272, the region terminology selected by the region terminology selecting unit 292, and the relationship terminology decided by the viewer and the person to be captured are applied. For example, by using a title template of ["relationship terminology" of "period terminology" at "region terminology"], the titling unit 282 generates a title of "Brother of 2004, at Kinkakuzi." Further, in case the viewer is included in the plurality of persons to be captured decided by the person to be captured deciding unit 214, the titling unit 282 may use a title template of ["period terminology," at "region terminology" with "relation terminology"] to generate a title of "2004, at Kinkakuzi with Brother."

Figure 9:
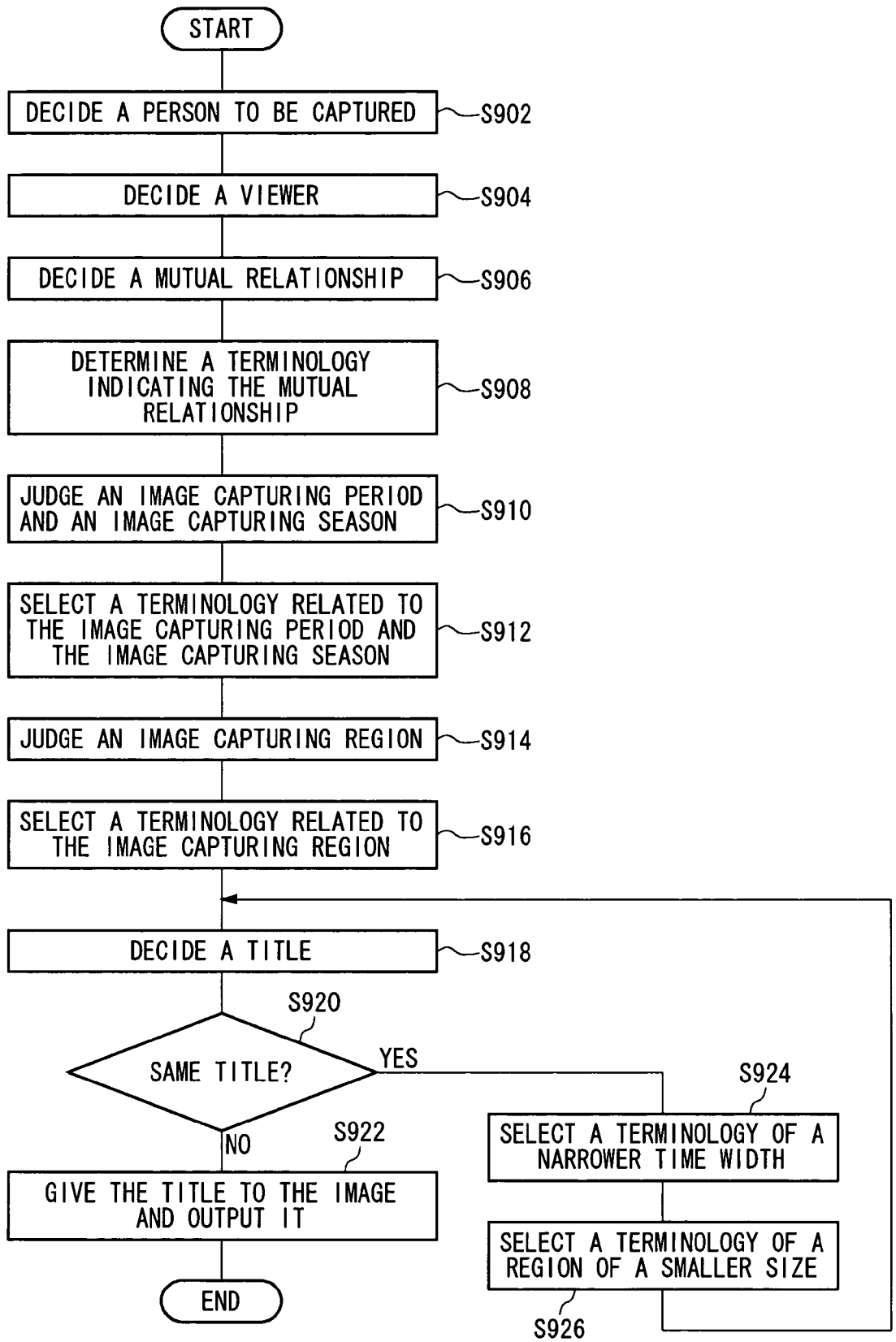
FIG. 9 shows an example of a process flow of titling.

FIG. 9 shows an example of a process flow of titling. The titling unit 282 decides a person to be captured of a captured image output by the outputting unit 110 by receiving a person ID of a person included in the captured image from the person to be captured deciding unit 214 (S902). Further, in case the titling apparatus 100 gives a title to a plurality of images, the person to be captured deciding unit 214 acquires a person ID of a person included in each of the plurality of images and the titling unit 282 decides a person ID acquired from the most images out of the person IDs received from the person to be captured deciding unit 214 as a person ID of a person to be captured.

Then, the titling unit 282 decides a viewer by receiving a person ID of the viewer from the viewer deciding unit 216 (S904). Then, the titling unit 282 decides a relationship of the person to be captured to the viewer from the data stored in the personal relationship storing unit 284 (S906). Then, the titling unit 282 determines a term showing the relationship of the person to be captured to the viewer (S908).

Further, the image capturing period judging unit 274 judges an image capturing period and an image capturing season when a captured image output by the outputting unit 110 has been captured (S910). Then, on the basis of the image capturing period and the image capturing season judged in S910, the period terminology selecting unit 272 selects a term related to the period and the season from the period terminology storing unit 270 (S912). Further, the image capturing region judging unit 294 judges an image capturing region where the captured image output by the outputting unit 110 has been captured (S914). Then, on the basis of the image capturing region judged in S914, the region terminology selecting unit 292 selects a term related to the image capturing region from the region terminology storing unit 290 (S916).

Then, the titling unit 282 determines a title using the terms selected in S908, S912, and S916 for the image output by the outputting unit 110 (S918). Then, the titling unit 282 judges whether or not the same titles are given to a plurality of images and/or a plurality of image groups (S920). At this time, in case of giving a title to each of the plurality of images output by the outputting unit 110, the titling unit 282 may judges whether or not the title given to each image and/or each image group is the same as that of others. In addition, in case the outputting unit 110 printouts images and titles to a printing medium, the titling unit 282 may judges whether or not the same titles are given to a plurality of images output on the recording medium.

In S920, in case it is judged that titles given to the plurality of images and/or the plurality of image group are not the same, the titling unit 282 sends titles which should be given to the images to the output controlling unit 220 and the output controlling unit 220 makes the outputting unit 110 output the images and the titles (S922). Further, in case it is judged that the same titles are given to the plurality of images and/or the plurality of image group, the period terminology selecting unit 272 selects a new term which is different from the term selected in S912 and of which time width is shorter than that of the term (S924). At this time, the period terminology selecting unit 272 selects a new term for each of the images to which the same titles are given in S920.

Then, the region terminology selecting unit 292 selects a new term which is different from the term selected in S916 and of which size is smaller than that of the term (S926). Further, the period terminology selecting unit 272 selects a new term for each of the plurality of images and/or the plurality of image groups judged to be given with the same titles in S920. Then, the titling unit 282 determines a new title for S918 using the terms selected in S924 and S926. By this, the titling apparatus 100 can provide a different title for each of a plurality of images and/or a plurality of image groups and provide the user 180 with them.

Figure 10:
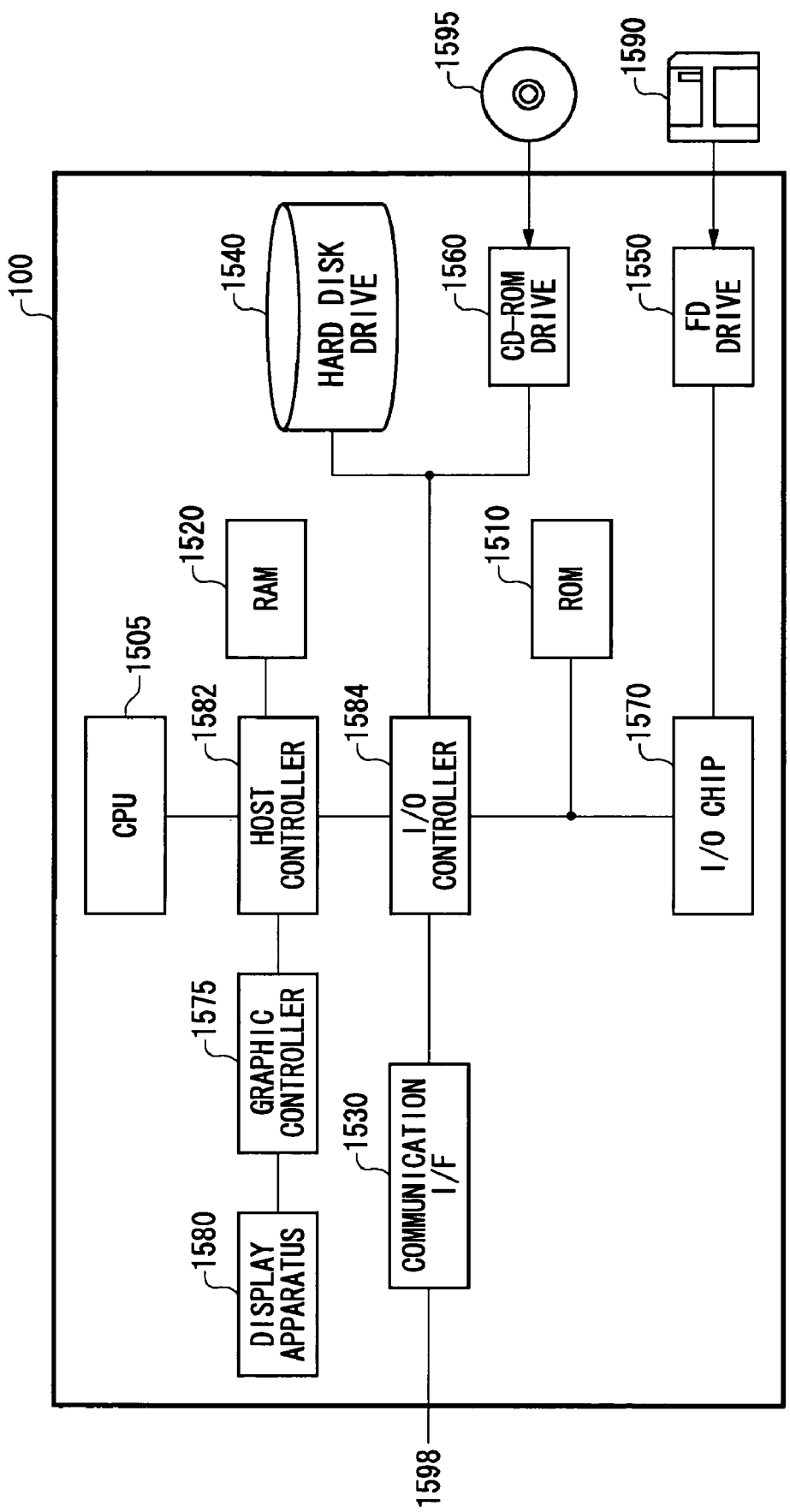
FIG. 10 shows a hardware configuration of the titling apparatus 100.

FIG. 10 shows a hardware configuration of the titling apparatus 100 according to the present embodiment. The titling apparatus 100 includes a CPU peripheral part comprising a CPU 1505, a RAM 1520, a graphic controller 1575, and a display apparatus 1580 which are connected with each other by a host controller 1582, an input and output part comprising a communication interface 1530 connected to the host controller 1582 by an input and output controller 1584 ("I/O controller 1584"), a hard disk drive 1540, and a CD-ROM drive 1560, and a legacy input and output part comprising a ROM 1510 connected to the I/O controller 1584, a flexible disk drive 1550, and an input and output chip 1570 ("I/O chip 1570").

The host controller 1582 connects the RAM 1520 with the CPU 1505 having access to the RAM 1520 at a high transmission rate and the graphic controller 1575. The CPU 1505 operates and performs control of each part on the basis of programs stored in the ROM 1510 and the RAM 1520. The graphic controller 1575 acquires image data which is generated on a frame buffer provided in the RAM 1520 by the CPU 1505, etc. and displays it on the display apparatus 1580. Instead, the graphic controller 1575 may include a frame buffer storing an image data generated by the CPU 1505, etc. therein.

The I/O controller 1584 connects the host controller 1582 with the hard disk drive 1540, the communication interface 1530, and the CD-ROM drive 1560, which are relatively high-speed I/O apparatus. The hard disk drive 1540 stores a program and data used by the CPU 1505. The communication interface 1530 communicates with a network communication apparatus 1598 and transfers a program or data. The CD-ROM drive 1560 retrieves a program or data from a CD-ROM 1595 and provides the hard disk drive 1540 and the communication interface 1530 with it via the RAM 1520.

Further, the I/O controller 1584 is connected with the ROM 1510 and a relatively low-speed I/O apparatus such as the flexible disk drive 1550 and the I/O chip 1570. The ROM 1510 stores a booting program executed when the titling apparatus 100 starts to operate, a program depending on the hardware of the titling apparatus 100, and the like. The flexible disk drive 1550 retrieves a program or data from a flexible disk 1590 and provides the hard disk drive 1540 and the communication interface 1530 with it via the RAM 1520. The I/O chip 1570 connects the flexible disk drive 1550 with various I/O apparatus via a parallel port, a serial port, a keyboard port, a mouse port, and the like.

A program executed by the CPU 1505 is stored in a recording medium such as the flexible disk 1590, the CD-ROM 1595, or an IC-card and provided by a user. The program stored in the recording medium may be compressed or not. The program is installed in the hard disk drive 1540 from the recording medium, retrieved by the RAM 1520, and executed by the CPU 1505.

The program executed by the CPU 1505 makes the titling apparatus 100 perform functions of the image capturing unit 102, the recording unit 104, the outputting unit 110, the captured image storing unit 210, the face image storing unit 212, the person to be captured deciding unit 214, the viewer deciding unit 216, the voice storing unit 218, the output controlling unit 220, the output time acquiring unit 222, the period terminology storing unit 270, the period terminology selecting unit 272, the image capturing period judging unit 274, the image capturing time storing unit 276, the titling unit 282, the personal relationship storing unit 284, the reference location storing unit 286, the region terminology storing unit 290, the region terminology selecting unit 292, the image capturing region judging unit 294, and the image capturing location storing unit 296.

The program described above may be stored in a recording medium of the outside. An optical recoding medium such as a DVD, a PD, etc., a magneto-optical recording medium such as an MD, a tape medium, and a semiconductor memory such as an IC card can be used as the recoding medium in addition to the flexible disk 1590 and the CD-ROM 1595. Further, a storing apparatus such as a hard disk or a RAM provided in a server system connected with a dedicated communication network and internet may be used as the recording medium and may provide the titling apparatus 100 with the program through the network.

Although the present invention has been described by way of exemplary embodiments, it should be understood that those skilled in the art might make many changes and substitutions without departing from the spirit and the scope of the present invention which is defined only by the appended claims.

What is claimed is:

1. A titling apparatus for giving a title to a captured image, comprising:
    a captured image storing unit for storing a captured image group comprising a plurality of captured images;
    an image capturing time storing unit for storing image capturing time when each of the plurality of captured images stored by said captured image storing unit is captured;
    an image capturing period judging unit for judging an image capturing period and an image capturing season including the image capturing time stored by said image capturing time storing unit;
    a period terminology storing unit for storing terminology related to the period and the season, the terminology corresponding to the period and the season;
    a titling unit for giving a title to the captured image group stored by said captured image storing unit by using the terminology stored by said period terminology storing unit to be corresponding to the period and the season including the image capturing period and the image capturing season judged by said image capturing period judging unit; and
    an output time acquiring unit for acquiring an output time when the plurality of captured images stored by said captured image storing unit are required to output,
    wherein said period terminology storing unit stores a plurality of terms respectively related to a plurality of periods with different time widths each of which includes a period and a season, the term corresponding to the period and the season,
    said titling unit gives a title by using a term related to a period of a wider time width out of the plurality of terms stored by said period terminology storing unit as a difference between the image capturing time included in the image capturing period and the image capturing season judged by said image capturing period judging unit and the output time acquired by said output time acquiring unit becomes longer,
    the plurality of captured images includes a first image and a second image, and
    when a difference between the output time and an image capturing time of the second image is longer than a difference between the output time and an image capturing time of the first image, said tilting unit gives a first title including a first term to the first image and a second title including a second term, which indicates a longer period than the first term, to the second image.

2. A titling apparatus as claimed in claim 1, further comprising:
    an image capturing location storing unit for storing an image capturing location where each of the plurality of captured images stored by said captured image storing unit is captured;
    an image capturing region judging unit for judging an image capturing region including the image capturing location stored by said image capturing location storing unit; and
    a region terminology storing unit for storing terminology related to regions comprising the locations, the terminology corresponding to the regions,
    wherein said titling unit gives the title to the captured image group by further using the terminology corresponded to the location in the image capturing region judged by said image capturing region judging unit, the terminology being stored by said region terminology storing unit.

3. A titling apparatus as claimed in claim 2, further comprising a reference location storing unit for storing a reference location which is a base of life of a user, wherein
    said region terminology storing unit stores a plurality of terms respectively related to a plurality of regions of different sizes comprising the locations, said terms corresponding to the locations, and
    said titling unit gives the title by using a term related to a region of a larger size out of the plurality of terms stored by the region terminology storing unit as a difference between the image capturing location, included in the image capturing region judged by said image capturing region judging unit, and the reference location stored by said reference location storing unit becomes farther.

4. A titling apparatus as claimed in claim 1, further comprising an outputting unit for outputting a plurality of images comprised in the captured image group stored by said captured image storing unit and a title given by said titling unit at the same time.

5. A titling apparatus as claimed in claim 4, further comprising:
 a person to be captured deciding unit for deciding a person to be captured of the captured image stored by said captured image storing unit; and
 a viewer deciding unit for deciding a viewer who views the captured image output by said outputting unit,
 wherein said titling unit gives the title to the captured image group stored by said captured image storing unit based on a relationship between the person to be captured decided by said person to be capture deciding unit and the viewer decided by said viewer deciding unit, and
 said outputting unit outputs the plurality of images comprised in the captured image group stored by said captured image storing unit and the title given by said titling unit at the same time.

6. A titling apparatus as claimed in claim 5, wherein said person to be captured deciding unit decides each person to be captured of the plurality of captured images stored by said captured image storing unit, and
 said titling unit gives the title to the captured image group stored by said captured image storing unit based on a relationship between the person to be captured of the most captured images out of the plurality of persons decided by said person to be captured deciding unit and the viewer decided by said viewer deciding unit.

7. A titling unit as claimed in claim 5, further comprising a personal relationship storing unit for storing a mutual relationship among a plurality of persons,
 wherein said titling unit decides the relationship between the person to be captured decided by said person to be captured deciding unit and the viewer decided by said viewer deciding unit based on the mutual relationship among the plurality of persons stored by said personal relationship storing unit.

8. A titling apparatus as claimed in claim 7, further comprising a face image storing unit for storing a face image of a person corresponded to the person,
 wherein said person to be captured deciding unit decides the person to be captured stored by said captured image storing unit by comparing captured image stored by said captured image storing unit with the face image stored by said face image storing unit.

9. A titling apparatus as claimed in claim 7, further comprising:
 an image capturing unit for capturing the viewer who views the captured image output by said outputting unit; and
 a face image storing unit for storing the face image of the person corresponded to the person,
 wherein said viewer deciding unit decides the viewer who views the captured image output by said outputting unit by comparing the viewer image captured by said image capturing unit with the face image stored by said face image storing unit.

10. A titling apparatus as claimed in claim 7, further comprising:
 a recording unit for recording a voice of the viewer who views the captured image output by said outputting unit; and
 a voice storing unit for storing the voice of a person corresponded to the person,
 wherein said viewer deciding unit decides the viewer who views the captured image output by said outputting unit by comparing the voice recorded by said recording unit with the voice stored by said voice storing unit.

11. A titling method for giving a title on a captured image, comprising:
 a captured image storing step of storing a captured image group comprising a plurality of captured images;
 an image capturing time storing step of storing an image capturing time when each of the plurality of the captured images stored in said captured image storing step is captured;
 an image capturing period judging step of judging an image capturing period and an image capturing season including the image capturing time stored in said image capturing time storing step;
 a period terminology storing step of storing terminology related to the period and the season, the terminology corresponding to the period and the season;
 a titling step of giving a title to the captured image group stored in said captured image storing step by using the terminology stored in said period terminology storing step to be corresponding to the period and the season including the image capturing period and the image capturing season judged in said image capturing period judging step; and
 an output time acquiring step of acquiring an output time when the plurality of captured images stored by said captured image storing unit are required to output,
 wherein said period terminology storing step stores a plurality of terms respectively related to a plurality of periods with different time widths each of which includes a period and a season, the term corresponding to the period and the season,
 said titling step gives a title by using a term related to a period of a wider time width out of the plurality of terms stored by said period terminology storing step as a difference between the image capturing time included in the image capturing period and the image capturing season judged by said image capturing period judging step and the output time acquired by said output time acquiring step becomes longer,
 the plurality of captured images includes a first image and a second image, and
 when a difference between the output time and an image capturing time of the second image is longer than a difference between the output time and an image capturing time of the first image, said titling step gives a first title including a first term to the first image and a second title including a second term, which indicates a longer period than the first term, to the second image.

12. A non-transitory machine readable medium storing thereon a computer program for a titling apparatus for giving a title to a captured image, the program makes the tiling apparatus functions as:
 a captured image storing unit for storing captured image group comprising a plurality of captured images;
 an image capturing time storing unit for storing an image capturing time when each of the plurality of captured images stored by said captured image storing unit is captured;
 an image capturing period judging unit for judging an image capturing period and an image capturing season including the image capturing time stored by said image capturing time storing unit;
 a period terminology storing unit for storing terminology related to the period and the season, the terminology corresponding to the period and the season;
 a titling unit for giving a title to the captured image group stored by said captured image storing unit by using the terminology stored by said period terminology storing unit, to be corresponding to the period and the season including the image capturing period and the image capturing season judged by said image capturing period judging unit; and an output time acquiring unit for acquiring an output time when the plurality of captured images stored by said captured image storing unit are required to output, wherein said period terminology storing unit stores a plurality of terms respectively related to a plurality of periods with different time widths each of which includes a period and a season, the term corresponding to the period and the season, said titling unit gives a title by using a term related to a period of a wider time width out of the plurality of terms stored by said period terminology storing unit as a difference between the image capturing time included in the image capturing period and the image capturing season judged by said image capturing period judging unit and the output time acquired by said output time acquiring unit becomes longer, the plurality of captured images includes a first image and a second image, and when a difference between the output time and an image capturing time of the second image is longer than a difference between the output time and an image capturing time of the first image, said titling unit gives a first title including a first term to the first image and a second title including a second term, which indicates a longer period than the first term, to the second image.

13. A titling apparatus for giving a title to a captured image, comprising:

a captured image storing unit for storing captured image group comprising a plurality of captured images;

an image capturing location storing unit for storing an image capturing location where each of the plurality of captured images stored by said captured image storing unit is captured;

an image capturing region judging unit for judging an image capturing region including the image capturing location stored by said image capturing location storing unit;

a region terminology storing unit for storing terminology related to regions including the locations, the terminology corresponding to the regions; and a titling unit for giving a title to the captured image group stored by said captured image storing unit by using the terminology corresponded to the location in the image capturing region judged by said image capturing region judging unit, the terminology being stored by said region terminology storing unit; and a reference location storing unit for storing a reference location which is a base of life of a user, wherein said region terminology storing unit stores a plurality of terms respectively related to a plurality of regions of different sizes comprising the locations, said terms corresponding to the locations, said titling unit gives the title by using a term related to a region of a larger size out of the plurality of terms stored by the region terminology storing unit as a difference between the image capturing location, included in the image capturing region judged by said image capturing region judging unit, and the reference location stored by said reference location storing unit becomes farther, the plurality of captured images includes a first image and a second image, and when a difference between the reference location and an image capturing location of the second image is farther than a difference between the reference location and an image capturing location of the first image, said titling unit gives a first title including a first term to the first image and a second title including a second term, which indicates a larger region than the first term, to the second image.

14. A titling method for giving a title to a captured image, comprising:

a captured image storing step of storing captured image group comprising a plurality of captured images;

an image capturing location storing step of storing an image capturing location where each of the plurality of captured images stored in said captured image storing step is captured;

an image capturing region judging step of judging an image capturing region including the image capturing location stored in said image capturing location storing step;

a region terminology storing step of storing terminology related to regions including the locations, the terminology corresponding to the regions;

a titling step of giving a title to the captured image group stored in said captured image storing step by using the terminology corresponded to the location in the image capturing region judged in said image capturing region judging step, the terminology being stored in said region terminology staring step; and a reference location storing step of storing a reference location which is a base of life of a user, wherein said region terminology storing step stores a plurality of terms respectively related to a plurality of regions of different sizes comprising the locations, said terms corresponding to the locations, said titling step gives the title by using a term related to a region of a larger size out of the plurality of terms stored by the region terminology storing step as a difference between the image capturing location, included in the image capturing region judged by said image capturing region judging step, and the reference location stored by said reference location storing step becomes farther, the plurality of captured images includes a first image and a second image, and when a difference between the reference location and an image capturing location of the second image is farther than a difference between the reference location and an image capturing location of the first image, said titling step gives a first title including a first term to the first image and a second title including a second term, which indicates a larger region than the first term, to the second image.

15. A non-transitory machine readable medium storing thereon a computer program for a titling apparatus for giving a title to a captured image, the program makes the tiling apparatus functions as:

a captured image storing unit for storing captured image group comprising a plurality of captured images;

an image capturing location storing unit for storing an image capturing location where each of the plurality of captured images stored by said captured image storing unit is captured;

an image capturing region judging unit for judging an image capturing region including the image capturing location stored by said image capturing location storing unit;

a region terminology storing unit for storing terminology related to regions including the locations, the terminology corresponding to the regions;

a titling unit for giving a title to the captured image group stored by said captured image storing unit by using the terminology corresponded to the location in the image capturing region judged by said image capturing region judging unit, the terminology being stored by said region terminology storing unit; and a reference location storing unit for storing a reference location which is a base of life of a user, wherein said region terminology storing unit stores a plurality of terms respectively related to a plurality of regions of different sizes comprising the locations, said terms corresponding to the locations, said titling unit gives the title by using a term related to a region of a larger size out of the plurality of terms stored by the region terminology storing unit as a difference between the image capturing location, included in the image capturing region judged by said image capturing region judging unit, and the reference location stored by said reference location storing unit becomes farther, the plurality of captured images includes a first image and a second image, and when a difference between the reference location and an image capturing location of the second image is farther than a difference between the reference location and an image capturing location of the first image, said titling unit gives a first title including a first term to the first image and a second title including a second term, which indicates a larger region than the first term, to the second image.

* * * * *